US012748251B2

(12) United States Patent
Bucar et al.

(10) Patent No.: US 12,748,251 B2
(45) Date of Patent: Sep. 29, 2026

(54) ILLUMINATED PANEL FOR AUTOMOTIVE APPLICATIONS

(71) Applicant: Hella Saturnus Slovenija d.o.o., Ljubljana (SI)

(72) Inventors: Alen Bucar, Trebnje (SI); Rok Stante, Ljubljana (SI); Andrej Wagner, Ljubljana (SI); Janez Kogovsek, Ljubljana (SI); Alenka Bajec Strle, Ljubljana (SI)

(73) Assignee: Hella Saturnus Slovenija d.o.o., Ljubljana (SI)

( * ) Notice: Subject to any disclaimer, the term of this patent is extended or adjusted under 35 U.S.C. 154(b) by 356 days.

(21) Appl. No.: 18/541,180

(22) Filed: Dec. 15, 2023

(65) Prior Publication Data

US 2024/0159957 A1 May 16, 2024

Related U.S. Application Data

(63) Continuation of application No. PCT/EP2022/066609, filed on Jun. 17, 2022.

(30) Foreign Application Priority Data

Jun. 18, 2021 (EP) .................................... 21180398

(51) Int. Cl.
*G02B 6/10* (2006.01)
*F21V 8/00* (2006.01)
(Continued)

(52) U.S. Cl.
CPC ......... *G02B 6/0043* (2013.01); *G02B 6/0035* (2013.01); *G02B 6/006* (2013.01);
(Continued)

(58) Field of Classification Search
CPC .... G02B 6/0043; G02B 6/0035; G02B 6/006; G02B 6/0065; G02B 6/0088; G02B 6/009;
(Continued)

(56) References Cited

U.S. PATENT DOCUMENTS 9,857,526 B2 * 1/2018 Song ................. G02F 1/133617
10,725,224 B2 * 7/2020 Hwang ................ G02B 5/0242
(Continued)

FOREIGN PATENT DOCUMENTS

DE 102013016667 A1 7/2014
DE 102017214129 A1 2/2019
(Continued)

*Primary Examiner* — Jennifer Doan
(74) *Attorney, Agent, or Firm* — Husch Blackwell LLP

(57) ABSTRACT

A multi-layer panel structure for a vehicle is provided, and includes a first layer of an optically transparent material adapted to serve as a light guide. The first layer has an upper surface, a lower surface, and edges, and is configured to receive light from at least one light source via at least one edge. The first layer further includes at least one optical element for outcoupling light at least from an upper surface of the first layer. The panel structure further includes an upper second layer disposed on the upper surface of the first layer, and a lower second layer disposed on the lower surface of the first layer. Each are arranged to cover the whole of the upper and lower surface of the first layer in an uninterrupted, continuous fashion. Both are of a second optically transparent material having a refractive index lower than the first layer.

25 Claims, 4 Drawing Sheets

(51) Int. Cl.

| | |
|---|---|
| ***G09F 13/04*** | (2006.01) |
| ***H01Q 1/32*** | (2006.01) |
| ***H01Q 1/42*** | (2006.01) |
| *B60R 13/00* | (2006.01) |

(52) U.S. Cl.
CPC ......... *G02B 6/0065* (2013.01); *G02B 6/0088* (2013.01); *G02B 6/009* (2013.01); *G02B 6/0091* (2013.01); *G09F 13/0445* (2021.05); *H01Q 1/3233* (2013.01); *H01Q 1/421* (2013.01); *B60R 13/005* (2013.01)

(58) Field of Classification Search
CPC .............. G02B 6/0091; G09F 13/0445; H01Q 1/3233; H01Q 1/421; H01Q 1/422; B60R 13/005
See application file for complete search history.

(56) References Cited

U.S. PATENT DOCUMENTS

| | | | |
|---|---|---|---|
| 12,060,015 | B2 | 8/2024 | Schneebauer et al. |
| 2011/0176325 | A1 * | 7/2011 | Sherman ............. G09F 13/0409 362/551 |
| 2015/0308639 | A1 | 10/2015 | Keranen et al. |
| 2020/0217477 | A1 | 7/2020 | Caruso et al. |
| 2022/0024374 | A1 * | 1/2022 | Studeny ................ B60R 13/005 |
| 2023/0062751 | A1 * | 3/2023 | Katsurada ................. F21S 2/00 |

FOREIGN PATENT DOCUMENTS

| | | | |
|---|---|---|---|
| DE | 102018220997 | A1 | 6/2020 |
| EP | 2383364 | A1 | 11/2011 |
| EP | 3434473 | A1 | 1/2019 |
| WO | 2020078916 | A2 | 4/2020 |
| WO | 2021018422 | A1 | 2/2021 |
| WO | 2021047772 | A1 | 3/2021 |
| WO | 2021122554 | A1 | 6/2021 |

* cited by examiner

ILLUMINATED PANEL FOR AUTOMOTIVE APPLICATIONS

CROSS REFERENCE

This application claims priority to PCT Application No. PCT/EP2022/066609, filed Jun. 17, 2022, which itself claims priority to EP Application No. 21180398.6, filed Jun. 18, 2021, the entireties of both of which are hereby incorporated by reference.

FIELD OF THE INVENTION

The present disclosure relates generally to an illuminated panel structure for vehicles. It has particular application as a decorative element or as a cover for electromagnetic transmitting and receiving elements in the automotive industry.

BACKGROUND OF THE INVENTION

Vehicles typically have an external and/or internal structure comprised of panels. By vehicle is meant any automotive conveyance such as automobiles, motorbikes, boats, but also non-motorized vehicles such a bicycles or trailers. Panels may be used to provide a desired contour and decorative design. Particularly in the automotive industry, the ability to provide such decorative elements on vehicles, for example in the form of an emblem or distinctive pattern, is useful to distinguish a brand. An illuminated panel increases the potential to distinguish one brand or model from another.

Sensors play an increasing role in today vehicles. In particular, radar systems are commonly used on the outer surface of vehicles for detecting the speed and range of objects for collision avoidance and adaptive cruise control systems. Radar sensors comprise a radio transmitter and receiver element located close to one another, often in the same unit. To protect the transmitter and receiver elements from damage and the elements, the sensor is provided with a cover, which is typically referred to as a radome. This cover may also serve as a decorative component, for example, by supporting an emblem of the vehicle manufacturer. The cover must be substantially transparent to the radio waves of interest and to this end is preferably of uniform thickness and devoid of discontinuities and angles to minimise reflection and absorption of radio waves.

US 2020/0217477 describes a light emitting system that can be incorporated in a vehicle body panel. However, such a structure is not suitable for covering radar sensors, which presents a particular challenge due to the limited product dimensions, high number of components and the requirement that the radar function not be impaired.

WO2020/078916 A2 and DE 10 2018220997 A1 both describe illuminated radar covers for vehicles that carry a decorative element in the form of a metal layer, foil or similar. The illumination allows the vehicle emblem to be distinguishable at night or in conditions of poor lighting as well as during the day. A disadvantage of these arrangements, however, is that they require a relatively complex structure to maintain air gaps between adjacent layers, which over time can degrade the function. The structures are also not suited to larger panels that may be used on a vehicle body or interior.

BRIEF SUMMARY OF THE INVENTION

It is an object of the present invention to provide an illuminated panel structure that is suited to both decorative panels and as a protective cover for radar and other sensors without impairing the sensor operation and which provides a uniform and homogenous luminance that does not degrade with time.

The above objects are achieved in a panel structure for a vehicle, a cover for an electromagnetic sensor comprising a panel structure as well as in a method for fabricating a panel structure.

In some embodiments, there is provided a multi-layer panel structure for a vehicle, the multi-layer panel structure including a first layer of an optically transparent material adapted to serve as a light guide, the first layer having an upper surface and a lower surface and edges and being configured to receive light from at least one light source via at least an edge or the upper or lower surface, the first layer further comprising at least one optical element for outcoupling light at least from an upper surface of the first layer, the panel structure further comprising an upper second layer disposed on the upper surface of the first layer and a lower second layer disposed on the lower surface of the first layer each of the upper and lower second layers being arranged to cover the whole of the upper and lower surface of the first layer in an uninterrupted, continuous fashion, the upper and lower second layers being of a second material having a refractive index lower than the first layer.

By providing continuous layers of a lower refractive index on the first layer, light leakage from the light guide is prevented even in the presence of impurities that may deposit on the structure. Light coupled into the first layer can provide a homogeneous background illumination by virtue of at least one outcoupling optical element. The continuous second layer further preclude the need for an air gap on one or both sides of the first layer, which simplifies the manufacture and assembly of the structure and also ensures a reliable illumination function over time. By uninterrupted and continuous is meant that the upper and lower second layers cover a single area without cutouts. The upper and lower second layers may be of a different material, such that the upper second layer is optically transparent, while the lower second layer is substantially opaque.

In a favourable embodiment, a graphic layer arranged on at least a part of an outer surface of at least one of the upper and lower second layers, the graphic layer being of an optically opaque and/or reflective material. The graphic layer is preferably arranged on an outer surface of the lower second layer. The graphic layer provides a decorative component, which does not impact on the light transmission in the first layer by virtue of the second layer interface.

In a preferred embodiment, the multi-layer panel structure is substantially transparent to radio waves and includes at least one portion of substantially uniform thickness destined to be disposed over a radar transmitter and receiver. In this manner, the structure may be used to cover one or more radar sensors so protecting the sensor and associated circuitry without affecting the sensor function.

The refractive index of the first layer preferably has a refractive index between 1.2-1.9, and more preferably between 1.5-1.6, while second layer preferably has a refractive index of between 1.1-1.6.

In a preferred embodiment, the at least one optical element comprises a light diffusing, reflecting and/or refracting surface on the first layer. This may be a surface comprising regular or irregular microstructures, grooves or granular elevations.

In an alternative embodiment, the at least one optical element may comprise a light diffusing, reflecting and/or refracting material applied to or integrated in the first layer.

In a preferred arrangement, the panel structure comprises at least one light source disposed adjacent the first layer and arranged to couple light into the first layer. By positioning a light source at the edge of the structure, this source will be effectively hidden from view, so reducing glare for the observer. The light source may couple light into an edge of the first layer or into the upper or lower a surface of this layer. By light source is meant both a light generating element, such as an LED and a light conduit, such as an optical fibre.

To improve the durability of the panel structure and thus maintain the look and function of this structure, it preferably comprises at least one protective outer layer. This layer may be a protective lacquer. This layer is particularly useful for protecting a graphic layer, particularly when this is on an upper surface of the second layer and hence is vulnerable to impacts and wear from the environment.

In a particularly advantageous embodiment, the lower surface of the panel structure may be provided with an optically reflective layer. This improves the efficiency of the plate and the homogeneity of the illumination perceived by an observer at the upper surface of the plate, particularly when the graphic layer is on an upper surface of the second layer, i.e. on an outwardly facing surface.

In other embodiments, a cover for an electromagnetic sensor is provided, the cover comprising a multi-layer structure as defined above and further comprising a frame coupled to an outer rim of multi-layer structure, the frame being of a light blocking material and adapted to accommodate at least one light source. The frame further obscures of the light source from the view of an observer and additionally protects the light source and accompanying electronics.

In some embodiments, the frame is arranged to extend under the panel structure to enclose a space, the frame being substantially transparent to electromagnetic radiation. The frame and panel structure thus together enclose a space for protecting the light sources and accompanying electronics, while the cover as a whole is designed to limit the attenuation of the electromagnetic waves to and/or from the sensor.

In some embodiments, the frame is formed directly on the lower surface of said multi-layer structure. Providing the frame as part of the multi-layer structure simplifies assembly. In a still further embodiment the light source is in moulded into one of the frame and the multi-layer structure.

In an alternative embodiment, the frame is arranged to extend under the panel structure to enclose a space adapted to accommodate an electromagnetic sensor. Thus, the sensor may also be located within the cover, i.e. between the panel structure and the frame, which reduces the number of elements the electromagnetic waves must pass through and hence minimises the impact on the sensor function, while simultaneously being protected.

In some embodiments, the panel structure is substantially curved in cross section, preferably domed with a substantially uniform angle of curvature in cross section at least in the central portion. Preserving a uniform angle of curvature limits the interference sustained by the electromagnetic radiation.

The present invention further relates to a method of fabricating a multi-layer panel structure as described previously. This method includes the steps of: providing a first layer of a first refractive index, forming at least one optical element on one of an upper or lower surface of the first layer, the optical element being adapted to outcouple light at least from an upper surface of the plate, providing a second layer at least on an upper surface of the first layer, the second layer being of a lower refractive index than the first layer, at least partially covering the second layer with a graphic layer.

Preferably, the step of providing the first layer includes forming a plastic material, such as PC or PMMA, for example by injection moulding or thermoforming.

The at least one optical element may be formed by applying an optically diffusing material and preferably by moulding a diffusing material together with the plastic material in a 2K process. Additionally or alternatively, the at least one optical element may be formed by forming light diffusing microstructures on a surface of the first plate.

In some embodiments, the step of providing the second layer includes coating the first layer with a second layer, preferably by spin-coating, lacquering, painting, tampo-printing, spray-coating, sputtering, film transfer or hot stamping, wherein the second layer is preferably a siloxane-based resin.

In still further embodiments, the steps of providing the first and second layer includes providing the second layer and inmolding the first layer onto the second layer, the second layer preferably being a foil of one of PTFE and FEP.

In some embodiments, the steps of providing the first and second layers comprises 2K-molding of the first and second layers, preferably wherein the first and second layers comprise a polymer and at least one of the first and second layers is doped to alter the refractive index. Advantageously the first layer may be doped with one of Ge and Mn. The second layer may be doped with one of B or F.

The method may also include the step of applying an optically reflective layer to a lower surface of the plate.

The method may also include the application of a protective layer to an upper and lower surface of the plate.

Further steps of the method may include: attaching a frame to the rim of the first layer, where the attachment may be by mechanical means, such as screws, rivets, clips, deformation of the frame, adhesive tape adhesion, or alternatively by chemical means, such as glue, lacquer, electromagnetic force using magnets, electric charge; arranging at least one light source adjacent a rim of the first layer.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

The present invention relates to an illuminated panel structure for covering an exterior and/or interior part of a vehicle. The structure may cover one or more sensor, in particular radar sensors, and serve as a protective cover for those sensors.

Figure 1:
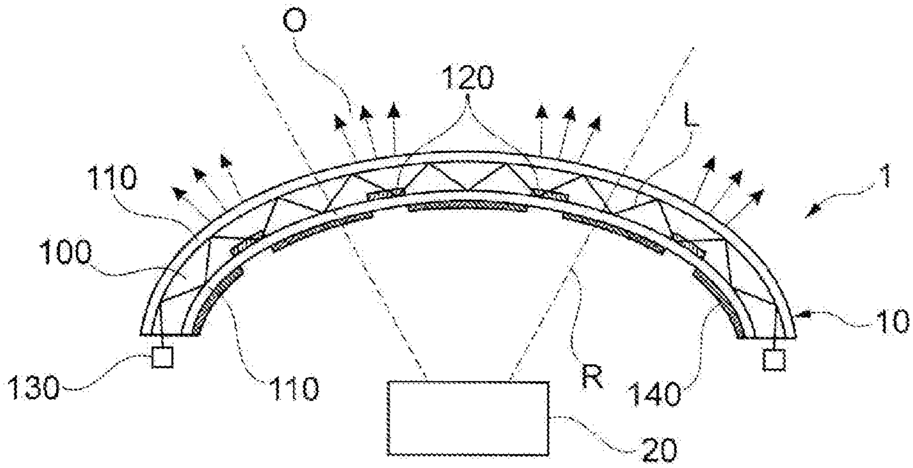
FIG. 1 is a schematic illustration of an illuminated panel structure serving as a cover for radar in accordance with an embodiment of the present invention.

FIG. 1 shows a cover 1, also referred to as a radome, for a radar sensor comprising an illuminated panel structure 10 in accordance with the present invention. The illuminated panel structure 10 is moulded in a domed shape and is arranged over a radar sensor 20, which comprises one or more radio transmitters and/or receivers or antennas in the conventional manner. The radio waves emitted and/or received are depicted as a cone R in FIG. 1. The whole assembly can be attached to the front of a vehicle, for example, to a facia or grille of a vehicle.

The illuminated panel structure 10 is multi-layered with a substantially even and constant thickness at least in the section covering the radar sensor 20 to ensure good radar performance. The geometry of the illuminated panel structure 10 is also devoid of abrupt changes or discontinuities for the same reason. In the illustrated example, the panel structure 10 is domed with a substantially uniform degree of curvature at least in a central portion that coincides with a radar cone R. It will be understood, however, that the panel structure may be substantially planar, over its whole structure, or at least in the portion located above the radar cone R. In this illustrated embodiment, the panel structure 10 is arranged centrally over the radar sensor 20. It will be appreciated, however, that the panel structure 10 may extend beyond the sensor on one or more sides, and may even cover multiple such sensors.

As shown in FIG. 1, the panel structure 10 includes a first layer 100 that serves as a light guide. Two light sources 130 are arranged at the outer rim of this first layer and arranged such that the light is coupled into the first layer 100. These light sources 130 preferably comprise one or more LEDs provided with associated power supply and control circuitry. The LEDs may be configured to generate white light or light of a specific colour. Two light sources 130 are illustrated in the figures, but it will be appreciated that a single light source or more than two light sources may be used.

Figure 2:
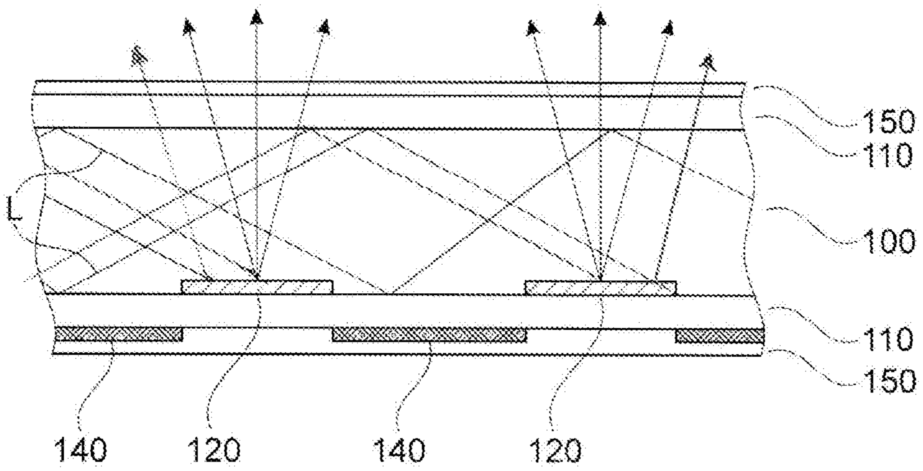
FIG. 2 is a schematic illustration showing details of the panel structure.

FIG. 2 shows detailed view of the panel structure 10. As is visible in FIG. 2, on both the upper and lower surfaces of the first layer 100 are arranged second layers, specifically optical insulating layers 110. These optical insulating layers 110 have a lower refractive index than the first layer 100 and thus ensure that light coupled into the first layer 100 is subjected to total internal reflection at the upper and lower surfaces of this layer 100 and thus propagates through it. The reflected light beams are illustrated in FIGS. 1 and 2 as L. The optical insulating layer 110 serves to protect the light guide 100 from light leakage due to impurities that might deposit on the surface or graphic elements that could otherwise alter the refractive index boundary at the surface of the light guide 100. The second layer thus prevents unwanted glare for an observer and ensures that the cover 10 provides a homogenous background illumination. The provision of optical insulating layers 102 on both the upper and lower surfaces of the light guide 100 ensures that light is reliably guided through layer 100 and so obviates the need for an air gap, which can be complex to manufacture and assemble and over time may risk the infiltration of dust, moisture or other contaminants, which could degrade the performance of the light guide 100.

The light guide 100 is made of a material that is substantially transparent to both light and to the radio waves used by the radar sensors. Suitable materials include thermoplastic polymers, such as polycarbonate (PC) or PMMA. The thickness of the light guide 100 depends on the application but is preferably within the range of 1 to 5 mm. The light guide 100 preferably has a refractive index of between 1.2 and 1.9.

The upper optical insulating layer 110 is preferably substantially transparent to light and optically clear. The lower optical insulating layer 110 may also be optically transparent, but this layer could equally be less transparent or even opaque. Both second layers 110 are substantially transparent to the radio waves used by the radar sensors, when the panel structure covers such a sensor. It will be understood by those skilled in the art that this requirement is not necessary when the panel is purely decorative or covers other sensor types. The optical insulating layer 110 may be made of a siloxane-based resin, such as those manufactured by Inkron Oy, Finland. The resin may be applied by spin-coating, lacquering, painting, tampo-printing, spray-coating, sputtering, film transfer, hot stamping or another suitable method. When made in this manner, the optical insulating layer 100 can be very thin, substantially thinner than the first layer 100, and have a thickness of the order of 1-6μ. The optical insulating layer 110 may alternatively be provided as a polymer foil, for example of polytetrafluoroethylene (PTFE) or fluorinated ethylene propylene (FET). The first and second layers 100, 110 are then preferably prepared by foil in-moulding, i.e. the insulating layer foil 110 is inserted into the moulding tool and the first layer then added, such that insulating layers 110 are attached to the first layer 100 during production of this layer. This can result in an optical insulating layer of thickness up to around 500 μm. A further manner of providing the second insulating layer 110 is by surface treatment or functionalization of the first layer 100. More specifically, a surface of the first layer 100 may be modified to decrease the refractive index locally. Suitable methods include fluorination and Boron doping of the surface. A still further method of providing the second insulating layer 110 is by 2-component (2K) moulding of the first and second layers. In this case, the first and second layers 100, 110 are both formed of a polymer blend, such as modified polyvinylidene fluoride (PVDF), modified to alter the refractive index. Possibly modification techniques include germanium (Ge) or manganese (Mn) doping to increase the refractive index for the first layer 100 and/or doping with boron (B) or fluorine (F) to reduce the refractive index for the second layer 110. This technique provides thicker optical insulating layers 110 or the order of several millimetres. The first and second layers 100, 110 can then have comparable thicknesses.

The panel structure 10 may include upper and lower optical insulating layers 110 of the same type or different types. The optical insulating layer preferably has a thickness of between 1-20 μm, still more preferably between 2-6 μm and has a refractive index of less than 1.6, preferably 1.1-1.6.

As shown in both FIGS. 1 and 2, a number of optical elements 120 are provided in the first layer 100. In the illustrated example of FIGS. 1 and 2, the optical elements 120 are shown only on the lower surface of the first layer 100, however, it will be understood that they may alternatively be provided on the upper surface, or on both the lower and upper surfaces of the light guide 100. Alternatively, or in addition, one or more optical elements 120 may be arranged in the body of the first layer 100 (not shown). These optical elements 120 serve to outcouple light from the light guide 100 essentially by interrupting the total internal reflection on the surface of the first layer. These elements thus diffuse light by causing a refraction, reflection and/or diffraction of the light either at the surface of first layer or in the body of this layer 100 which causes it to leak out of the light guide 100. As a consequence, the panel structure 10 is perceived as illuminated, although the light sources 130 are not visible.

The optical elements 120 may be composed of diffractive surface relief structures such as microstructures or a roughened or granular surface formed on the upper or lower surface of the light guide, formed, for example, by chemical or mechanical etching of the light guide surface. The optical elements 120 may alternatively, or additionally, be formed by applying a diffusing material to the light guide surface, or by incorporating a light-diffusing material in the light guide 100, for example, by using a 2K injection moulding process.

The optical elements 120 may be provided as several discrete elements arranged in a regularly spaced pattern on the upper and/or lower surface of the light guide 100 to provide an even distribution of light over the surface of the panel structure 10. Alternatively, the optical elements 120 may be formed as one or more dispersing surfaces at desired locations on the light guide 100. The optical elements 120 may further be arranged to form a desired design or image, such as an emblem or logo, or the negative of a desired design, so that the observer will see an illuminated design or a shaded design.

On the underside of the lower optical insulating layer 110 there may additionally be provided a graphic layer 140, comprising a film or foil, for example a metallic film or a foil on which a design is applied or that may be arranged to display a desired design such as the emblem or logo of a manufacturer. This film is preferably very thin, of the order of a few μm so that changes in thickness of the cover 10 between areas where the graphic layer is present and those where graphic material is absent have a negligible effect on the radiation emitted and/or received by the radar sensor 20. The material of the film 140 is substantially opaque and/or reflective to visible light, but substantially transparent to the electromagnetic radiation used by sensor 20, i.e. to radio waves. The design is visible through the multilayer structure of the light guide 100 and insulating layer 110. The graphic layer 140 may alternatively be formed on the upper surface of panel structure 10, i.e. on the outer surface of the upper insulating layer 110 (see FIG. 5), or even on the outer surface of both the upper and lower insulating layers 110. In all cases, the graphic layer 140 is separated from the first layer 100 by the optically insulating layer 110 to preclude the risk of light leakage that may otherwise occur on the boundary between the graphic layer 140 and first layer 100. When the optical elements 120 are formed in a specific design as described above, the graphic layer 140 may advantageously be arranged to occupy the spaces between the optical elements 120 so that the design is visible not only by the presence of the graphic layer but also by the illuminated portions between the graphic elements. In this way, a desired shape may be displayed as an illuminated design or alternatively as the negative of an illuminated design.

As shown in the detailed section illustrated in FIG. 2, the panel structure 10 may also include an outer protective layer 150 applied to the upper and/or lower surface. This protective layer 150 is preferably a varnish or resin of sufficient hardness to protect the surface of the cover, and particularly the graphic layer 140, from wear and scratches. In addition, the protective layer 150 may be used to compensate for differences in thickness caused by the application or removal of the graphic layer. The protective layer 150 is omitted from the remaining figures in the interests of clarity.

Figure 3:
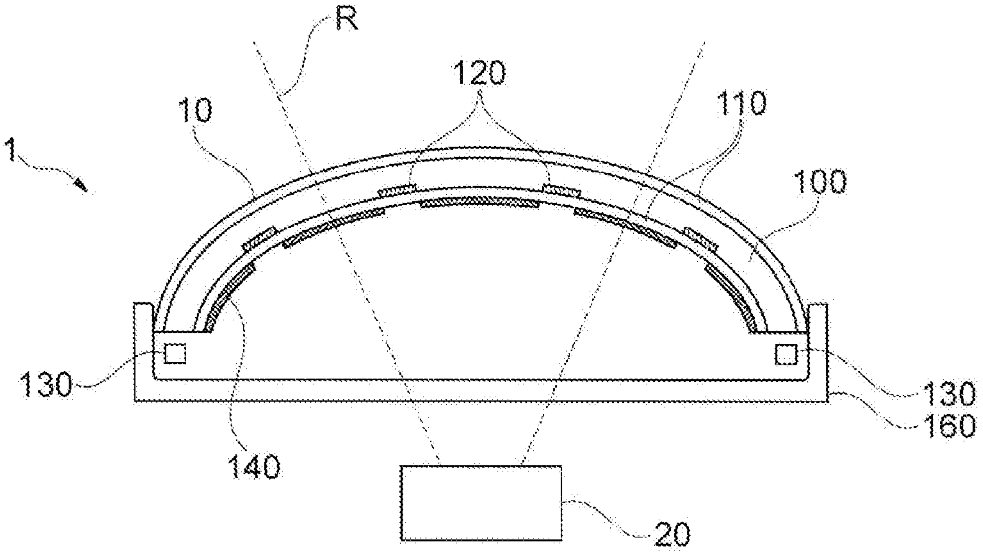
FIG. 3 is a schematic illustration showing an illuminated panel structure serving as a cover for radar in accordance with a further embodiment of the present invention.

Turning now to FIG. 3 there is shown a cover 1 in accordance with a further embodiment of the invention. In FIG. 3, the cover 1 includes a frame 160 that extends downwards from the lower rim of panel structure 10 and under the panel structure 10 to enclose a space bordered by panel structure 10 and frame 160. The light sources 130 and associated electronics are located within this space. The frame 160 serves to block unwanted light and also protect the one or more light sources 130 and associated electronics. The frame 160 may also be provided with coupling elements, such as clips, screw holes or the like, that enable the cover 1 to be mounted over a radar sensor 20 on a vehicle, for example. The frame 160 is of a substantially optically opaque material, preferably of moulded plastic formed by injection moulding. The frame 160 may be fixed to the outer rim of the panel structure 10 by mechanical means, such as screws, rivets, clips, deformation of the frame 160, adhesive tape, or the like, chemical means, such as glue or lacquer, electromagnetic force using magnets, electric charge, or similar or by any other suitable fixing method.

As shown in FIG. 3, the cover 1 including the panel structure 10 and frame 160 may be arranged over a radar sensor 20, such that the radio waves illustrated by the cone R must pass through both the frame 160 and the panel structurer 10. In this case, the frame 160 must be substantially transparent to the radio waves transmitted and/or received by the sensor 20. In addition, the spacing between the frame 160 and the panel structure 10, at least in the central area of the cover 1 that corresponds to the radio wave cone R, is chosen to minimise the attenuation of radio waves. In an alternative arrangement, the frame 160 does not extend over the whole space occupied by the panel structure 10 as shown in FIG. 3, but instead covers only part of the way under the panel structure 10 such that the space is not enclosed, but the light sources 130 are protected and light leakage from the light sources 130 at the edge of the panel structure 10 are precluded or minimised.

In a further non-shown embodiment, the frame 160 may be formed directly on the lower optical insulating layer 110 and/or the graphical layer 140 overlying this lower optical insulating layer 110 such that there is no air gap.

Figure 4:
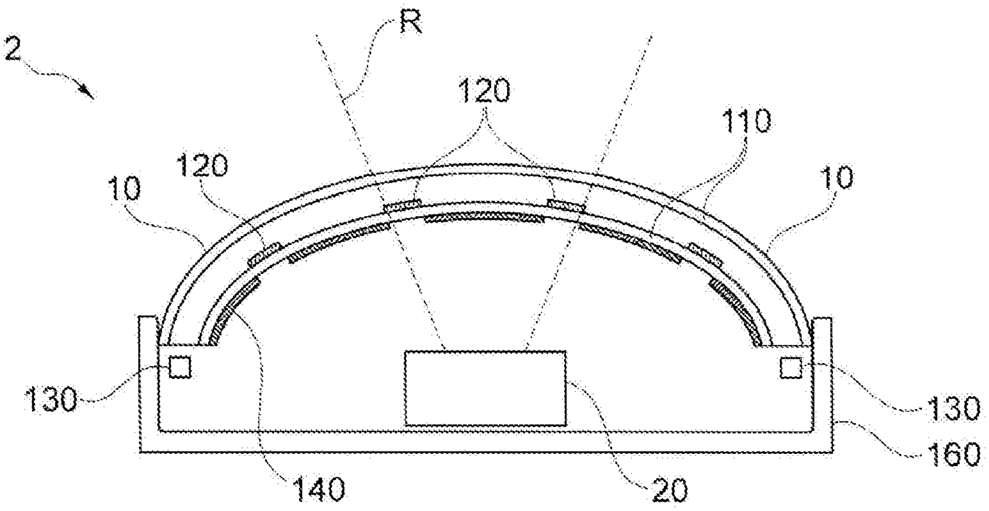
FIG. 4 is a schematic illustration of a radar cover using the illuminated panel structure according to a further embodiment.

FIG. 4 shows a further embodiment of the cover 1. In this figure, the radar sensor 20 is accommodated between the frame 160 and the panel structure 10, i.e. frame 160 and panel structure 10 together form a housing enclosing a protective space within which the radar sensor 20 light sources 130 and other electronic components may be accommodated. This arrangement reduces the attenuation of the radar signal as these pass through only two air/material boundaries, namely the two outer surfaces of the panel structure 10.

In some embodiments, the frame 160 is essentially annular with an outer edge that essentially corresponds to that of the panel structure 10 or extends slightly beyond this, and an inner edge that extends inside the outer rim of the panel structure 10 to provide an essentially annular place serving as a protective housing for the light sources 130 and associated electronics. This annular space may be closed. In such an arrangement, the frame does not impact on the performance of the radar sensor 20 as it is not traversed by the cone R.

Figure 5:
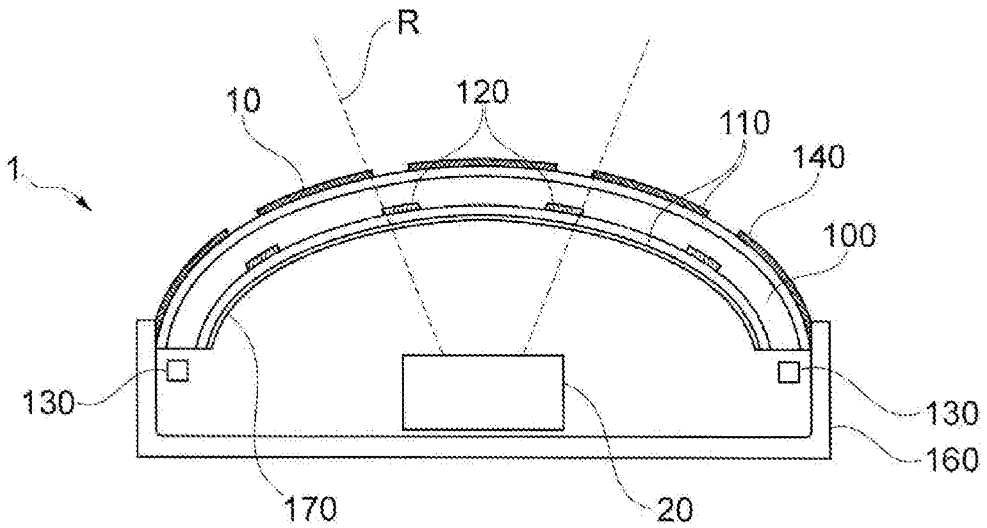
FIG. 5 is a schematic illustration of a radar cover using the illuminated panel structure according to a still further embodiment.

Turning now to FIG. 5 there is shown a further embodiment of the cover 1. The cover 1 illustrated in FIG. 5 is similar to that shown in FIG. 4 with the notable difference that a graphic layer 140 is provided on the upper side of the panel structure 10, i.e. on the outer surface of the upper optically insulating layer 110. As discussed above, a hardened protective layer 150 is preferably applied over the graphic layer, although this is not shown in FIG. 5. The embodiment of FIG. 5 also includes an optically reflective layer 170 that is applied to a lower surface of the panel structure, specifically on the outer surface of the lower optically insulating layer 110. If a graphic layer 140 is present on the underside of the panel structure 10, the optically reflective layer 170 is applied over that layer, i.e. on the outside of that layer, such that an observer can perceive the graphic layer 140 on top of the optically reflective layer 170. The optically reflective layer 170 serves to improve the efficiency and homogeneity of the illumination of the panel structure 10 by reflecting all light out of the structure 10. The layer 170 is preferably a white or pale film or coating, e.g. paint or pigmented lacquer of a few μm in thickness that is applied to the remaining surface of the panel structure 10 by adhesion or thermal bonding or another suitable manner. The optically reflective layer may also serve as a protective layer, or alternatively be coated with a protective layer 150.

In the foregoing description, the illuminated panel structure 10 has been described specifically with reference to its application to a cover for a radar sensor. It will be understood, however, that the illuminated panel structure 10 may be used as a panel or section of a panel on the exterior or interior of a vehicle, for example. In this case, graphic elements may be provided with a protective layer. It is further possible that the panel structure 10 be provided with an additional layer serving as a lens in contact with the upper surface of the panel structure. It will further be appreciated that the panel structure 10 may have different forms to adapt to the desired form of the vehicle body.

Figure 6:
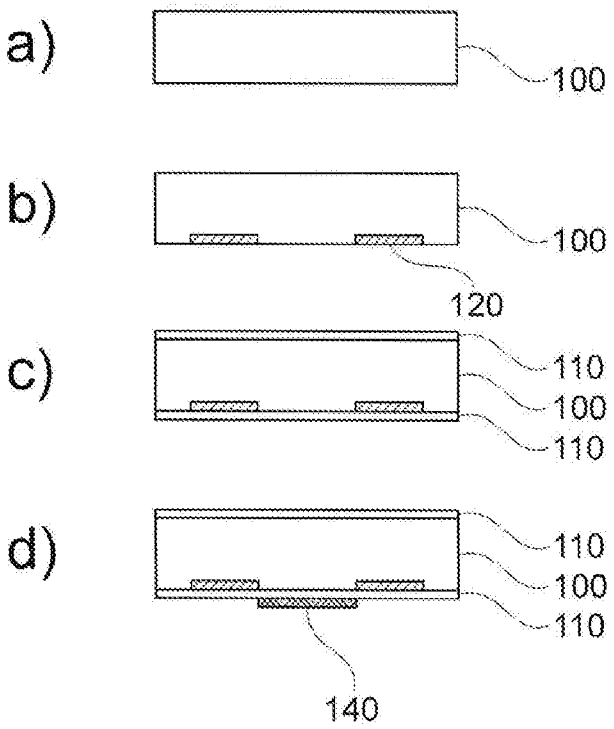
FIG. 6 is an illustration of the process of fabrication of an illuminated panel structure in accordance with the present invention.

FIG. 6 shows the steps of a process for manufacturing an illuminated panel structure 10 according to the embodiments described above. In a first step designated a) the first light guide layer 100 is formed into the desired domed or planar shape of the panel structure 10 by injection moulding, thermoforming or other suitable process. At step b), one or more optical elements are provided at the lower or upper surface of the light guide layer 100. These optical elements may be formed by mechanical means or chemical etching to create structured or roughened diffusing surfaces, or by application of a diffusing material to the surface of the layer 100. Alternatively, the optical elements may be formed integrally with the light guide 100, for example by 2K injection moulding of a diffusing material and thus be formed simultaneously with step a) (see FIG. 7). At step c) optical insulating layers 110 are applied to the upper and/or lower surfaces of the light guide layer 100. When provided as a resin, such as a siloxane-based resin, the optical insulating layers 110 may be applied directly to the surface of the light guide 100 by spin-coating, lacquering, painting, tampo-printing, spray-coating, sputtering, film transfer, hot stamping or another suitable method and optionally hardened or cured. In an alternative process, one or both of the insulating layers 110 may be created by surface treatment of the light guide layer 100, preferably by fluorination of the surface to a desired thickness. It will be understood that the interface between the first and second layers 100, 110 will not be so well defined. When using this technique to create the second layer, it is preferable that the optical elements be formed in the body of the light guide layer 100. At step d), a graphic layer is applied to at least one of the outer surfaces formed by the optical insulating layers 110. This step is optional. The graphic layer 140 may be a metallization layer, which is then partially removed to form the desired design by use of a laser or chemical etching. Alternatively, the graphic layer may be a foil on which a design is applied. The foil may be hot stamped to the optical insulating layer 110. Alternatively, the foil may be inmolded into the structure by overmolding the optical insulating layer with an additional PC or PMMA layer.

Figure 7:
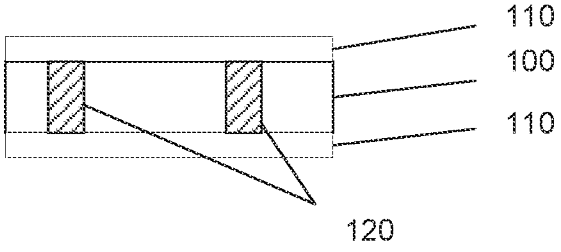
FIG. 7 is a schematic illustration of the process of fabrication of the illuminated panel structure in accordance with a further embodiment.

FIG. 7 illustrates an alternative process for fabricating the panel structure to those shown in FIGS. 6*a*) to 6*c*). In an alternative embodiment, the light guide layer 100, optical insulating layers 110 and optical elements 120 are formed in a single or multi-step 2K moulding process.

Figure 8:
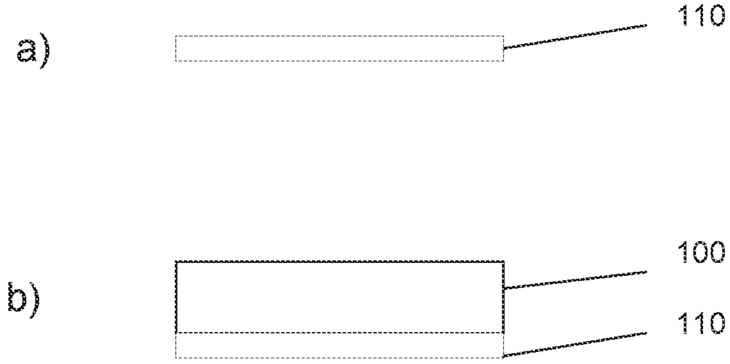
FIG. 8 is a schematic illustration of the process of fabrication of the illuminated panel structure in accordance with a still further embodiment.

FIG. 8 illustrates a further process for fabricating the panel structure to those shown in FIGS. 6*a*) to 6*c*). In a first step illustrated in FIG. 8*a*) a foil, such as a PTFE or FEP foil is provided. This foil may also be provided with a graphic layer 140. The foil may be inserted in a moulding tool adapted to provide the panel structure with the desired shape. In a subsequent step shown in FIG. 8*b*), the material making up the light guide layer 100 moulded over the first layer 110 forming part of the panel structure 10. The second optical insulating layer 110 on the opposing surface of the light guide layer 100 may be provided in the same way, in which case the optical elements should be formed in the body of the light guide layer 100 by 2K injection moulding. Alternatively, the second optical insulating layer 110 may be formed by one of the other techniques described herein, possibly after forming the optical elements on a surface of the light guide layer 100.

The process may include further steps, for example the application of a protective layer 150 in the form of a lacquer, for example can be applied to the outer surface of the plate, but particularly over the graphic layer 140 to protect this and possibly compensate for variations in thickness. An optically reflective layer 170 may be applied prior to this step on the lower surface of the plate 10, i.e. on the surface that faces the radar sensor 20 and is directed away from the observer. A lens may also be provided on the upper surface of the panel structure.

It will be understood that the examples and embodiments described herein can be used in various combinations and sub-combinations.

LIST OF REFERENCE NUMERALS

R Radar cone
L light path
O Out-coupled light
10 Radome
20 Radar emitter/receiver
100 Light guide
110 Optical insulator
120 Optical element
130 Light source
140 Graphic layer
150 Protective layer
160 Frame
170 Reflective layer

The invention claimed is:

1. A multi-layer panel structure for a vehicle, the multi-layer panel structure comprising:

a first layer of an optically transparent material adapted to serve as a light guide, said first layer having:

an upper surface;

a lower surface;

edges; and at least one optical element for outcoupling light at least from an upper surface of said first layer; and wherein the first layer is configured to receive light from at least one light source via at least an edge or the upper or lower surface, an upper second layer disposed on the upper surface of said first layer;

a lower second layer disposed on the lower surface of said first layer, wherein each of said upper and lower second layers are arranged to cover all of said upper and lower surfaces of said first layer in an uninterrupted, continuous fashion, wherein the upper and lower second layers are a second material having a refractive index lower than said first layer, and wherein said multi-layer panel structure is substantially transparent to radio waves.

2. The multi-layer panel structure as claimed in claim 1, further comprising a graphic layer arranged on at least a part of an outer surface of at least one of said upper and lower second layers, said graphic layer being of an optically opaque and/or reflective material.

3. The multi-layer panel structure as claimed in claim 1, wherein said multi-layer panel structure includes at least one portion of substantially uniform thickness destined to be disposed over a radar transmitter and receiver.

4. The multi-layer panel structure as claimed in claim 1, wherein said first layer has a refractive index of 1.2-1.9.

5. The multi-layer panel structure as claimed in claim 1, wherein said at least one optical element further comprises at least one of a light diffusing, reflecting and/or refracting surface of said first layer and a light diffusing, reflecting and/or refracting material applied to or integrated in said first layer.

6. The multi-layer panel structure as claimed in claim 1, further comprising at least one light source disposed adjacent the first layer and being arranged to couple light into said first layer.

7. A cover for an electromagnetic sensor, the cover comprising:

a multi-layer structure as claimed in claim 1;

a frame coupled to an outer rim of the multi-layer structure, said frame being of a light blocking material and adapted to accommodate at least one light source.

8. The cover as claimed in claim 7, wherein said frame is arranged to extend under said multi-layer structure, said frame being substantially transparent to radio waves.

9. A cover as claimed in claim 8, wherein said frame is formed directly on the lower surface of said multi-layer structure.

10. The cover as claimed in claim 8, wherein said frame is arranged to extend under said multi-layer structure to enclose a space adapted to accommodate a radar sensor.

11. A method of fabricating a multi-layer panel structure as claimed in claim 1, said method comprising the steps of:

providing a first layer of a first refractive index;

providing at least one optical element in said first layer, said optical element being adapted to outcouple light at least from an upper surface of said structure; and providing a second layer on an upper surface and a lower surface of said first layer, said second layer being of a lower refractive index than said first layer.

12. The method as claimed in claim 11, wherein said step of providing said first layer includes forming a plastic material, such as PC or PMMA.

13. The method as claimed in claim 11, wherein said step of providing at least one optical element includes at least one of forming an optically diffusing material in said first layer.

14. The method as claimed in claim 11, wherein said step of providing said second layer includes coating said first layer with a second layer.

15. The method as claimed in claim 11, wherein said steps of providing said first and second layer includes providing said second layer and molding said first layer onto said second layer, said second layer preferably being a foil of one of PTFE and FEP.

16. The method as claimed in claim 11, wherein said step of providing said second layer comprises modifying a surface layer of said first layer to a depth corresponding to said second layer.

17. The method as claimed in claim 11, wherein said steps of providing said first and second layers comprises 2K-molding of said first and second layers.

18. The multi-layer panel structure as claimed in claim 2, wherein said graphic layer is arranged on an outer surface of said lower second layer.

19. The multi-layer panel structure as claimed in claim 4, wherein said second layer has a refractive index of 1.1-1.6.

20. The cover as claimed in claim 10, wherein said light source is in moulded into one of said frame and said multi-layer structure.

21. The method as claimed in claim 13 wherein said step of forming an optically diffusing material in said first layer is by moulding a diffusing material together with a plastic material in a 2K process and forming light diffusing microstructures on a surface of said first layer.

22. The method as claimed in claim 14, wherein said step of coating said first layer with a second layer is by spin-coating, lacquering, painting, tampo-printing, spray-coating, sputtering, film transfer or hot stamping, and wherein said second layer is a siloxane-based resin.

23. The method as claimed in claim 16, wherein said modification is obtained by one of fluorination and doping with Boron.

24. The method as claimed in claim 17, wherein said first and second layers comprise a polymer and at least one of said first and second layers is doped to alter the refractive index, wherein said first layer is doped with one of Ge and Mn, wherein said second layer is doped with one of B or F.

25. A multi-layer panel structure for a vehicle, the multi-layer panel structure comprising:

a first layer of an optically transparent material adapted to serve as a light guide, said first layer having:

an upper surface;

a lower surface;

edges; and at least one optical element for outcoupling light at least from an upper surface of said first layer, wherein the first layer is configured to receive light from at least one light source via at least an edge or the upper or lower surface;

an upper second layer disposed on the upper surface of said first layer;

a lower second layer disposed on the lower surface of said first layer, wherein each of said upper and lower second layers are arranged to cover all of said upper and lower surfaces of said first layer in an uninterrupted, continuous fashion, wherein the upper and lower second layers are of a second material having a refractive index lower than said first layer; and a graphic layer arranged on at least a part of an outer surface of at least one of said upper and lower second layers, said graphic layer being of an optically opaque and/or reflective material, wherein said multi-layer panel structure is configured for use as at least one of: a decorative panel on an exterior or interior of a vehicle, an emblem or logo for a vehicle, and a cover for a non-radar electromagnetic sensor.

* * * * *